US011128526B2

(12) United States Patent
Ingah et al.

(10) Patent No.: US 11,128,526 B2
(45) Date of Patent: Sep. 21, 2021

(54) METHOD AND SYSTEM FOR RESTORING CONFIGURATION SETTINGS OF CUSTOMER PREMISES EQUIPMENT

(71) Applicant: CenturyLink Intellectual Property LLC, Broomfield, CO (US)

(72) Inventors: Zubin Ingah, Centennial, CO (US); Michael D. Sprenger, Boulder, CO (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 97 days.

(21) Appl. No.: 16/109,216

(22) Filed: Aug. 22, 2018

(65) Prior Publication Data

US 2019/0140899 A1 May 9, 2019

Related U.S. Application Data

(60) Provisional application No. 62/582,158, filed on Nov. 6, 2017.

(51) Int. Cl.
*H04L 12/24* (2006.01)

(52) U.S. Cl.
CPC ...... *H04L 41/0806* (2013.01); *H04L 41/0813* (2013.01); *H04L 41/0856* (2013.01)

(58) Field of Classification Search
CPC ............. H04L 41/0806; H04L 41/0813; H04L 41/0856
See application file for complete search history.

(56) References Cited

U.S. PATENT DOCUMENTS 8,873,428 B1 * 10/2014 Orr ....................... H04L 41/082 370/254
2003/0120760 A1 * 6/2003 Fortin ................. H04L 41/0853 709/221
2004/0133689 A1 * 7/2004 Vasisht ............. H04L 29/12216 709/228
2008/0104442 A1 * 5/2008 Diao ..................... G06F 9/4401 714/3
2009/0292794 A1 * 11/2009 Ding ................... H04L 12/2834 709/221
2010/0180016 A1 * 7/2010 Bugwadia ............ G06F 9/4411 709/220
2012/0017250 A1 * 1/2012 Tirasirikul ....... H04N 21/44222 725/85
2014/0304382 A1 * 10/2014 Buck ................... H04L 41/0806 709/222

(Continued)

*Primary Examiner* — Nicholas R Taylor
*Assistant Examiner* — Sanjoy Roy

(57) ABSTRACT

Novel tools and techniques are provided for implementing configuration data and settings on customer premises equipment ("CPE"), and, more particularly, for implementing storage, retrieval, and transfer of configuration data and settings associated with a user and/or a customer premises on CPE. In operation, CPE might set and store one or more configuration settings associated with a user and/or a customer premises. Next, a first CPE might receive a request to set the one or more configuration settings associated with the user or the customer premises on the first CPE or on a second CPE. Based on the request received, the CPE might retrieve from storage and set the one or more configuration settings associated with the user or the customer premises on the first CPE or on the second CPE.

20 Claims, 7 Drawing Sheets

(56) References Cited

U.S. PATENT DOCUMENTS

2015/0160935 A1* 6/2015 Nye .................... H04L 41/0806
717/178
2016/0285703 A1* 9/2016 Joe ...................... H04L 41/5051

* cited by examiner

METHOD AND SYSTEM FOR RESTORING CONFIGURATION SETTINGS OF CUSTOMER PREMISES EQUIPMENT

CROSS-REFERENCES TO RELATED APPLICATIONS

This application claims priority to U.S. Patent Application Ser. No. 62/582,158 (the "'158 Application"), filed on Nov. 6, 2017 by Michael D. Sprenger et al., entitled, "Novel Method for Storage and Restoration of Customer Premises Equipment (CPE) Configuration Data," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing configuration data and settings on customer premises equipment ("CPE"), and, more particularly, to methods, systems, and apparatuses for implementing storage, retrieval, and transfer of configuration data and settings associated with a user and/or a customer premises on CPE.

BACKGROUND

Currently, the configuration of customer premises equipment ("CPE") requires manual setup and manual entry of data crucial to a subscriber's service. There is no way to automatically restore data after the CPE experiences an error and there is no way to transfer data from an old CPE to a new CPE. The data that must be entered manually includes, but is not limited to, login credentials, wireless and security settings, or domain name server addresses, and/or the like. Small typographical errors may affect crucial information such as domain names or addresses for servers (e.g., outgoing or incoming mail servers, domain name servers, proxy servers), rendering the CPE partially or completely non-functional until the error is corrected. Additionally, if the CPE needs to be replaced or upgraded, customers generally have to manually reenter configuration data and settings on the new or upgraded CPE, which can be a tedious and potentially error-prone process. Further, devices communicatively coupled to the CPE often have to be reconfigured to reconnect with the new or upgraded CPE.

Hence, there is a need for more robust and scalable solutions for implementing configuration data and settings on CPE, and, more particularly, for methods, systems, and apparatuses for implementing storage, retrieval, and transfer of configuration data and settings associated with a user and/or a customer premises on CPE.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
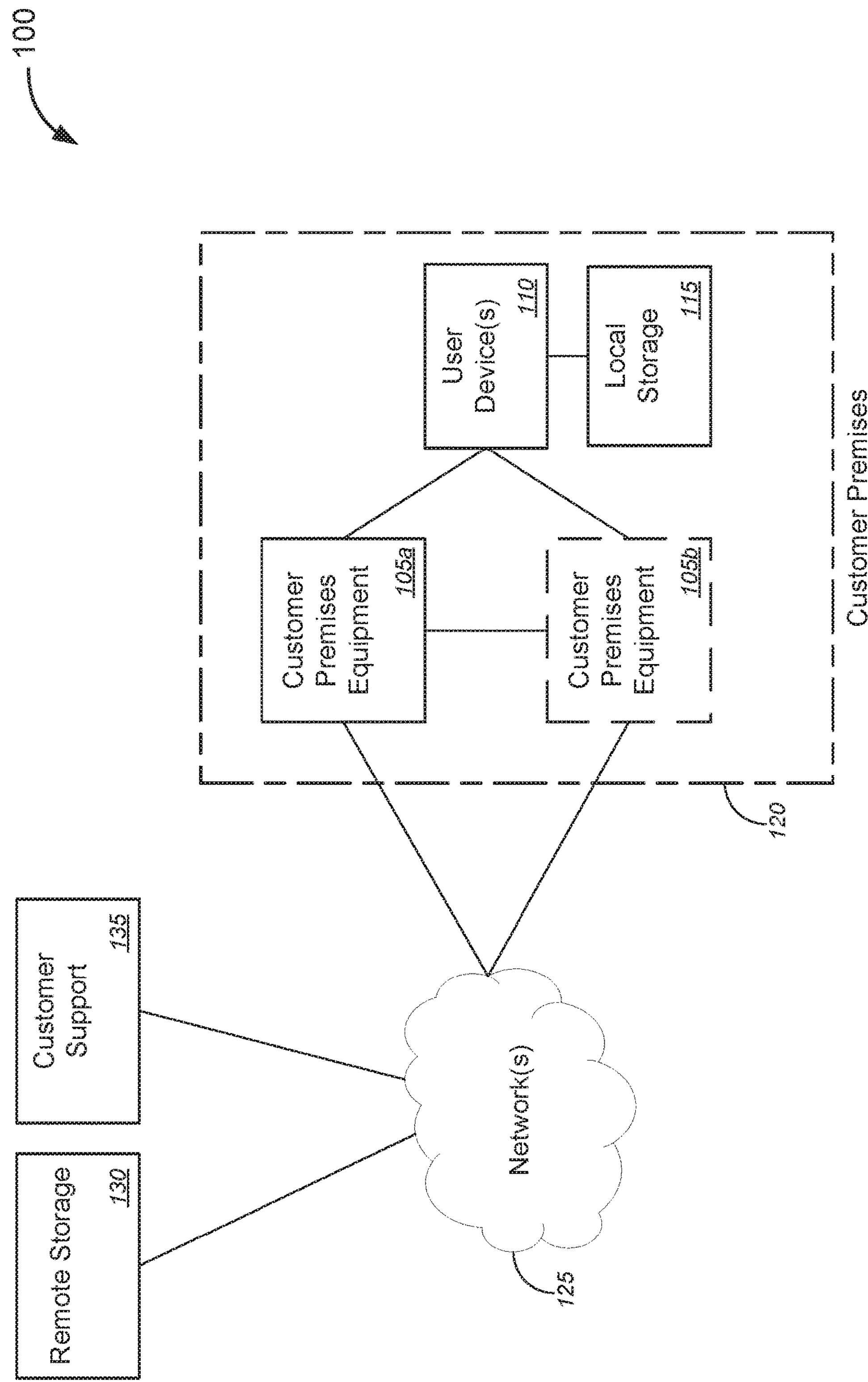
FIG. 1 is a schematic diagram illustrating a system for implementing configuration data and settings on customer premises equipment, in accordance with various embodiments.

Various embodiments provide tools and techniques for implementing configuration data and settings on customer premises equipment ("CPE"), and, more particularly, to methods, systems, and apparatuses for implementing storage, retrieval, and transfer of configuration data and settings associated with a user and/or a customer premises on CPE. Throughout the specification, CPE might also be referred to as a customer premises device.

In various embodiments, a method might optionally include setting, on a first customer premises device, one or more configuration settings associated with at least one of a user or a customer premises and storing, with the first customer premises device, the one or more configuration settings associated with the at least one of the user or the customer premises. The method might additionally include receiving, with at least one of a first customer premises device or a second customer premises device, a request to configure the at least one of the first customer premises device or the second customer premises device with one or more configuration settings associated with the at least one of the user or the customer premises; retrieving, with the at least one of the first customer premises device or the second customer premises device, the one or more configuration settings associated with the at least one of the user or the customer premises; and configuring, with the at least one of the first customer premises device or the second customer premises device, the at least one of the first customer premises device or the second customer premises device with the one or more configuration settings associated with the at least one of the user or the customer premises.

According to some embodiments, the method might further include detecting, with the first customer premises device, the second customer premises device; determining, with the first customer premises device, whether the second customer premises device is equivalent to the first customer premises device; based on a determination that the second customer premises device is equivalent to the first customer premises device, prompting the user to set the one or more configuration settings associated with the at least one of the user or the customer premises on the second customer premises device; receiving, with the one of the first customer premises device or the second customer premises device, an indication to set the one or more configuration settings associated with the at least one of the user or the customer premises on the second customer premises device; and setting, with the one of the first customer premises device or the second customer premises device, the one or more configuration settings associated with the at least one of the user or the customer premises on the second customer premises device.

In some embodiments, the method might additionally include determining, with the first customer premises device, that an error has occurred with the first customer premises device; based on a determination that an error has occurred with the first customer premises device, retrieving, with the first customer premises device, the one or more configuration settings associated with the at least one of the user or the customer premises; and setting, with the first customer premises device, the one or more configuration settings associated with the at least one of the user or the customer premises on the first customer premises device.

In sum, the various embodiments described above improve conventional systems by providing novel ways to restore and transfer configuration settings associated with at least one of a user and/or a customer premises. The various embodiments provide methods to save and back up crucial CPE configuration data or settings associated with a user and/or a customer premises with little or no user intervention. Further, the various embodiments provide ways to automatically reconfigure a first customer premises device or automatically configure a second customer premises device with configuration data or settings associated with the at least one of the user or the customer premises. The embodiments additionally allow customers to simply replace an old CPE with a new CPE, set the relevant configuration data or settings for the new CPE, and keep all of the existing settings for user devices around the home or office.

It is important to note that the embodiments described in this disclosure are different from a factory reset that is typically provided as an option for CPE. The factory reset completely wipes clean all CPE data and settings and restores CPE to factory condition, as the name implies. In this state, no information about the specific setup entered by a user or technician, and/or the like, is available and all of the information would have to be re-entered. The embodiments described herein save user-entered or technician-entered configuration data for CPE. Restoring configuration data from data storage will cause the CPE or new CPE to be placed back into a state where it can perform as configured by a user or technician, and/or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, CPE technology, computer technology, and/or the like. Each embodiment seeks to solve restoring configuration settings associated with at least one of a user and/or customer premises on a CPE or transferring configuration settings associated with at least one of a user or a customer premises between CPEs. In other words, the configuration settings are unique to a particular user and/or customer premises. Conventional computer technology does not allow for restoring configuration settings associated with at least one of a user and/or customer premises on a CPE or transferring configuration settings associated with at least one of a user or a customer premises between CPEs.

In order to facilitate restoring and transferring configuration settings on a CPE (e.g., a modem, an optical network terminal, a set-top box, a gateway, a media player, a camera, a sensor, or a thermostat, and/or the like), various embodiments provide for storing, with the first customer premises device, the one or more configuration settings associated with the at least one of the user or the customer premises and reconfiguring/transferring the one or more configuration settings associated with the user and/or customer premises on the first customer premises device or a new second customer premises device. The one or more configuration settings associated with a user and/or customer premises may be unique to a particular user, configured by a user, or unique to the customer premises, and/or the like.

In order to achieve this functionality, a user device or the first customer premises device may be used to determine that an error has occurred with the first customer premises device and one or more configuration settings associated with a user and/or customer premises have been lost. The user device or the first customer premises device might then restore/reconfigure one or more configuration settings associated with a user and/or customer premises that were lost because of the error. Additionally and/or alternatively, a user device/first customer premises device may be used to detect a new second customer premises device and transfer configuration settings associated with a user and/or customer premises to the new second customer premises device.

To the extent any abstract concepts are present in the various embodiments, those concepts can be implemented as described herein by devices, software, systems, and methods that involve specific novel functionality (e.g., steps or operations), such as, setting, on a first customer premises device, one or more configuration settings associated with at least one of a user or a customer premises, storing, with the first customer premises device, the one or more configuration settings associated with the at least one of the user or the customer premises, and using the one or more configuration settings that have been stored to automatically reconfigure the first customer premises device or configure a new second customer premises device, which optimizes the replacement of a customer premises device or reconfiguration of a customer premises device, and/or the like, to name a few examples, that extend beyond mere conventional computer processing operations. These functionalities can produce tangible results outside of the implementing computer system, including, merely by way of example, automatically reconfiguring CPE or easily replacing CPE with configuration settings and/or data associated with a user or a customer premises, or both.

In an aspect, a method might optionally comprise setting, on a first customer premises device, one or more configuration settings associated with at least one of a user or a customer premises and storing, with the first customer premises device, the one or more configuration settings associated with the at least one of the user or the customer premises. The method might additionally include receiving, with at least one of a first customer premises device or a second customer premises device, a request to configure the at least one of the first customer premises device or the second customer premises device with one or more configuration settings associated with the at least one of a user or a customer premises; retrieving, with the at least one of the first customer premises device or the second customer premises device, the one or more configuration settings associated with the at least one of the user or the customer premises; and configuring, with the at least one of the first customer premises device or the second customer premises device, the at least one of the first customer premises device or the second customer premises device with the one or more configuration settings associated with the at least one of the user or the customer premises.

In some embodiments, the first customer premises device and/or the second customer premises device may each comprise at least one of a modem, an optical network terminal, a set-top box, a gateway device, a media player, a gaming console, a camera, a sensor, a thermostat, a desktop computer, or a laptop computer, and/or the like.

The one or more configuration settings may be unique to a particular user and/or customer premises, set by a user and/or technician, and/or the like. The one or more configuration settings associated with at least one of a user or a customer premises might include, but are not limited to, at least one of one or more local area network settings, one or more wide area network settings, one or more service set identifiers, one or more login credentials, one or more Internet protocol ("IP") addresses, one or more domain names, one or more security settings, one or more remote management settings, one or more encryption types, one or more frequency settings, one or more blocked addresses, one or more permitted addresses, one or more calibration settings, one or more display settings, or one or more temperature settings, and/or the like.

According to some embodiments, the one or more configuration settings associated with the at least one of the user or the customer premises may be stored on and retrieved from at least one of a local storage device associated with the first customer premises device, a remote (or local) storage associated with a user device located at the customer premises, or a remote storage device located in a service provider network.

Merely by way of example, in some embodiments, the method might further include determining, with the first customer premises device, whether the one or more configuration settings associated with the at least one of the user or the customer premises have been changed. The one or more configuration settings may be changed by a user or a technician, or automatically by the customer premises device, and/or the like. Based on a determination that the one or more configuration settings associated with the at least one of the user or the customer premises have been changed, the method might include storing, with the first customer premises device, the one or more changed configuration settings associated with the at least one of the user or the customer premises. Additionally and/or alternatively, the one or more configuration settings associated with the at least one of the user or the customer premises may be periodically (e.g., hourly, daily, weekly, or monthly, etc.) stored on a local storage device or remote storage device.

In some embodiments, the method might further comprise detecting, with the first customer premises device, the second customer premises device; determining, with the first customer premises device, whether the second customer premises device is equivalent to the first customer premises device; and based on a determination that the second customer premises device is equivalent to the first customer premises device, automatically retrieving, with the one of the first customer premises device or the second customer premises device, the one or more configuration settings associated with the at least one of the user or the customer premises, and automatically setting, with the one of the first customer premises device or the second customer premises device, the one or more configuration settings associated with the at least one of the user or the customer premises on the second customer premises device. In this way, an old customer premises device may easily be replaced with a new customer premises device having the configuration settings of the old customer premises device without having to reprogram user devices communicatively coupled to the old customer premises device.

In additional embodiments, the method might include detecting, with the first customer premises device, the second customer premises device; determining, with the first customer premises device, whether the second customer premises device is equivalent to the first customer premises device; based on a determination that the second customer premises device is equivalent to the first customer premises device, prompting the user to set the one or more configuration settings associated with the at least one of the user or the customer premises on the second customer premises device; receiving, with the one of the first customer premises device or the second customer premises device, an indication to set the one or more configuration settings associated with the at least one of the user or the customer premises on the second customer premises device; and setting, with the one of the first customer premises device or the second customer premises device, the one or more configuration settings associated with the at least one of the user or the customer premises on the second customer premises device. The prompt may be displayed on at least one of the first customer premises device, the second customer premises device, or a user device that is in close proximity to at least one of the first customer premises device or the second customer premises device.

In various embodiments, the first customer premises device and the second customer premises device may be communicatively coupled together via at least one of a wired connection or a wireless connection.

In some cases, the method might further include determining, with the first customer premises device, that an error has occurred with the first customer premises device; based on a determination that an error has occurred with the first customer premises device, retrieving, with the first customer premises device, the one or more configuration settings associated with the at least one of the user or the customer premises; and setting, with the first customer premises device, the one or more configuration settings associated with the at least one of the user or the customer premises on the first customer premises device. In other words, the first customer premises device may retrieve the one or more configuration settings associated with the at least one of the user or the customer premises without the user or technician manually reentering the one or more configuration settings associated with the at least one of the user or the customer premises.

In another aspect, an apparatus might comprise at least one processor; and a non-transitory computer readable medium communicatively coupled to the at least one processor. The non-transitory computer readable medium might have stored thereon computer software comprising a set of instructions that, when executed by the at least one processor, causes the apparatus to: set one or more configuration settings associated with at least one of a user or a customer premises; store the one or more configuration settings associated with the at least one of the user or the customer premises; receive a request to set the one or more configuration settings associated with the at least one of the user or the customer premises; retrieve the one or more configuration settings associated with the at least one of the user or the customer premises; and set the one or more configuration settings associated with the at least one of the user or the customer premises on a first customer premises device.

According to some embodiments, the apparatus and the first customer premises device may be the same device. Alternatively, the apparatus and the first customer premises device may be different devices.

In various embodiments, the one or more configuration settings might include at least one of one or more local area network settings, one or more wide area network settings, one or more service set identifiers, one or more login credentials, one or more Internet protocol ("IP") addresses, one or more domain names, one or more security settings, one or more remote management settings, one or more encryption types, one or more frequency settings, one or more blocked addresses, one or more permitted addresses, one or more calibration settings, one or more display settings, or one or more temperature settings, and/or the like. Additionally, the one or more configuration settings associated with the at least one of the user or the customer premises may be stored on and retrieved from at least one of a local storage device associated with the first customer premises device, a remote storage device (or a local storage device) associated with a device located at the customer premises, or a remote storage device located in a service provider network, and/or the like.

In yet another aspect, a system might comprise a first customer premises device. The first customer premises device might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the first customer premises device to: set one or more configuration settings associated with at least one of a user or a customer premises; store the one or more configuration settings associated with the at least one of the user or the customer premises; receive a request to set the one or more configuration settings associated with the at least one of the user or the customer premises on at least one of the first customer premises device or a second customer premises device; retrieve the one or more configuration settings associated with the at least one of the user or the customer premises; and set the one or more configuration settings associated with the at least one of the user or the customer premises on the one of the first customer premises device or the second customer premises device.

The system might additionally include the second customer premises device. The second customer premises device might comprise at least one second processor and a second non-transitory computer readable medium communicatively coupled to the at least one second processor. The second non-transitory computer readable medium might have stored thereon computer software comprising a second set of instructions that, when executed by the at least one second processor, causes the second customer premises device to: retrieve the one or more configuration settings associated with the at least one of the user or the customer premises; and set the one or more configuration settings associated with the at least one of the user or the customer premises on the second customer premises device.

In some embodiments, the one or more configuration settings might include at least one of one or more local area network settings, one or more wide area network settings, one or more service set identifiers, one or more login credentials, one or more Internet protocol ("IP") addresses, one or more domain names, one or more security settings, one or more remote management settings, one or more encryption types, one or more frequency settings, one or more blocked addresses, one or more permitted addresses, one or more calibration settings, one or more display settings, or one or more temperature settings, and/or the like.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-7 illustrate some of the features of the method, system, and apparatus for implementing configuration data and settings on customer premises equipment ("CPE"), and, more particularly, to methods, systems, and apparatuses for implementing storage, retrieval, and transfer of configuration data and settings on CPE. The methods, systems, and apparatuses illustrated by FIGS. 1-7 refer to examples of different embodiments that include various components and steps, which can be considered alternatives or which can be used in conjunction with one another in the various embodiments. The description of the illustrated methods, systems, and apparatuses shown in FIGS. 1-7 is provided for purposes of illustration and should not be considered to limit the scope of the different embodiments.

With reference to the figures, FIG. 1 is a schematic diagram illustrating a system 100 for implementing configuration data and settings on customer premises equipment ("CPE") 105, in accordance with various embodiments.

In the non-limiting embodiment of FIG. 1, system 100 might include one or more CPEs (or one or more customer premises devices) 105*a* and 105*b* (collectively, "CPE 105" or "CPEs 105") and one or more user devices 110, each of which (or which collectively) might comprise a local storage device 115. Local storage device 115 may also be located in CPE 105. In some cases, local storage device 115 might be integrated within CPE 105 and/or user device(s) 110. In other cases, the local storage device 115 might be external to CPE 105 and/or user device(s) 110. System 100, according to some embodiments, might further include remote storage device 130 and customer support system 135.

In some embodiments, the CPE 105 might include, but is not limited to, one of a modem, an optical network terminal, a set-top box ("STB"), a gateway, a media player, a gaming console, a camera, a sensor, a thermostat, a desktop computer, or a laptop computer, and/or the like. The modem might include at least one of a digital subscriber line modem, a G.fast modem, or a cable modem, and/or the like. The set-top box might include an internet protocol television set-top box, or an over-the-top set-top box, and/or the like. The gateway might include at least one of a residential gateway, business gateway, a pay-per-view gateway, or a security gateway, and/or the like. The sensor may include at least one of window sensors or door sensors, motion detection sensors, or heat sensors, and/or the like.

In some embodiments, the user device(s) 110 might each include, without limitation, one of a laptop computer, a tablet computer, a desktop computer, a smart phone, a mobile phone, a personal digital assistant, a remote control device, a gaming console, a set-top box, a media player, a portable gaming device, a camera, a sensor, or a thermostat, and/or the like.

The CPE 105 might communicatively couple to each of the one or more user devices 110 and/or the local storage device 115 via a wireless connection and/or a wired connection. Each of the one or more user devices 110 might communicatively couple to the local storage device 115, either via wireless connection and/or via wired connection. In some cases, the CPE 105 might be paired, synced, or synchronized with the one or more user devices 110. Additionally and/or alternatively CPE 105*a* might be communicatively coupled to CPE 105*b* via a wireless connection and/or via a wired connection.

In some cases, the CPE 105, the one or more user device(s) 110, and the local storage device 115 may be disposed within a customer premises 120, which might be one of a single family house, a multi-dwelling unit ("MDU") within a multi-dwelling complex (including, but not limited to, an apartment building, an apartment complex, a condominium complex, a townhouse complex, a mixed-use building, etc.), a motel, an inn, a hotel, an office building or complex, a commercial building or complex, or an industrial building or complex, and/or the like.

System 100 might further include one or more remote storage devices 130 and/or one or more customer support systems 135 that might communicatively couple to the CPE 105 via one or more networks 125.

In operation, the CPE 105 or user device(s) 110 might set one or more configuration settings associated with at least one of a user or a customer premises 120 on CPE 105. The one or more configuration settings or data might include, but are not limited to, one or more local area network settings, one or more wide area network settings, one or more service set identifiers, one or more login credentials (e.g., login name, password, email address, etc.), one or more Internet protocol ("IP") addresses, one or more domain names, one or more security settings, one or more remote management settings, one or more encryption types, one or more frequency settings (e.g., bandwidth settings, frequency agility settings, etc.), one or more blocked addresses (e.g., website addresses, media access control addresses, etc.), one or more permitted addresses (e.g., website addresses, media access control addresses, etc.), one or more calibration settings (e.g., calibration settings of a television, calibration settings of modem, etc.), one or more display settings (e.g., display settings of television, etc.), or one or more temperature settings, and/or the like.

The one or more configuration settings may be set manually by a user of the CPE 105, may be set manually by a technician setting up or servicing CPE 105, or may be set automatically by the CPE 105 or user device(s) 110. The one or more configuration settings may be unique to the user or customer premises 120. The CPE 105 or user device(s) 110 may then store the one or more configuration settings associated with at least one of the user or the customer premises 120. The CPE 105 or user device(s) 110 may store the configuration settings locally or remotely in local storage device 115 or remote storage device 130, respectively. The storage process will be further described below with respect to FIGS. 2-4.

Next, the CPE 105 or user device(s) 110 might receive a request to set the one or more configuration settings associated with the at least one of the user or the customer premises 120 on CPE 105. In some embodiments, the request to set the one or more configuration settings may be received from a user of the CPE 105 or a technician servicing the CPE 105. Alternatively, in various embodiments, the CPE 105 or user device(s) 110 may detect that an error has occurred with the CPE 105 and that some or all of the configuration settings associated with the user and/or customer premises have been lost. Based on a determination that an error has occurred with the CPE 105, CPE 105 or user device(s) 110 may request to set some or all of the one or more configuration settings associated with the at least one of the user or the customer premises 120 on CPE 105.

Additionally and/or alternatively, based on a determination that an error has occurred with the CPE 105, CPE 105 or user device(s) 110 may prompt a user to reconfigure CPE 105. CPE 105 and/or user device(s) 110 might detect and/or identify a user device(s) 110 that is in close proximity or near the CPE 105 and/or a user. The prompt may then be displayed on a user device(s) 110 that is in close proximity or near CPE 105 and/or the user. Additionally and/or alternatively, CPE 105 may display the prompt. A user may then request to reconfigure CPE 105 by interacting with the prompt displayed on at least one of the CPE 105 and/or display device (e.g., one of user device(s) 110 that is capable of displaying content on a display screen, or the like). In additional embodiments, after automatically reconfiguring CPE 105, a notification may be displayed on CPE 105 and/or a user device(s) in close proximity to CPE 105 and/or to the user, the notification indicating that CPE 105 has been reconfigured with one or more configuration settings associated with the at least one of the user or the customer premises 120.

In other embodiments, CPE 105*a* or user device(s) 110 might receive a request from CPE 105*b* to set the one or more configuration settings associated with the at least one of the user or the customer premises 120 on CPE 105*b*. Additionally and/or alternatively, CPE 105*a* and/or user device(s) 110 may detect or determine that CPE 105*b* has entered the customer premises 120. CPE 105*a* and/or user device(s) may detect or determine that CPE 105*b* has entered the customer premises by detecting or determining that CPE 105*b* is attempting to connect to a network (e.g., a local area network, and/or the like), or by detecting that CPE 105*b* has been communicatively coupled (via a wired and/or wireless connection) to CPE 105*a* and/or user device(s) 110, and/or the like. CPE 105*a* and/or user device(s) 110 may then determine whether the CPE 105*b* is equivalent to CPE 105*a*. CPE 105*b* might be equivalent to CPE 105*a* if CPE 105*b* is the same as CPE 105*a*, if CPE 105*b* is capable of performing similar functionality as CPE 105*a*, and/or the like. Based on a determination that CPE 105*b* is equivalent to CPE 105*a*, CPE 105*a*, CPE 105*b*, and/or user device(s) 110 may request to set the one or more configuration settings associated with the at least one of the user or the customer premises 120 on CPE 105*b*.

Additionally and/or alternatively, based on a determination that CPE 105*b* is equivalent to CPE 105*a*, CPE(s) 105 or user device(s) 110 may prompt a user to set up one or more configuration settings on CPE(s) 105*b*. CPE 105 and/or user device(s) 110 might detect a user device(s) 110 that is in close proximity or near the CPE 105 and/or a user. The prompt may then be displayed on a user device(s) 110 that is in close proximity or near CPE 105 and/or the user. Additionally and/or alternatively, CPE 105 may display the prompt. A user may then request to set up one or more settings on CPE 105*b* by interacting with the prompt displayed on at least one of the CPE 105 and/or display device 110. In additional embodiments, after automatically setting up CPE 105*b*, a notification may be displayed on CPE 105 and/or a user device(s) in close proximity to CPE 105 and/or the user indicating that CPE 105*b* has been set up with one or more configuration settings associated with the at least one of the user or the customer premises 120.

Based on the request received from at least one of a user, a technician, a CPE 105, or user device(s) 110, and/or the like, the CPE 105 and/or user device(s) 110 may retrieve the one or more configuration settings associated with the at least one of the user or the customer premises 120 from local storage device 115, or remote storage device 130, and/or the like. The CPE 105 and/or user device(s) 110 may then set the one or more configuration settings associated with the at least one of the user or the customer premises 120 on the CPE 105 (e.g., CPE 105*a* and/or CPE 105*b*, and/or the like). In this way, the configuration settings may easily be restored on CPE 105 and/or CPE 105*a* may be easily replaced with CPE 105*b*.

In a non-limiting example, if the CPE 105*a* is a first modem and CPE 105*b* is a second modem, the first modem may be easily replaced by the second modem. The first modem, user device(s) 110, and/or second modem may request that the one or more configuration settings associated with the at least one of the user or the customer premises 120 be set up on the second modem. Once the configuration settings associated with the at least one of the user or the customer premises 120 are set up on the second modem, one or more user devices 110 or CPE 105 may be automatically coupled to the second modem without having to change any of the configuration settings for the one or more user devices 110 or CPE 105.

The one or more configuration settings associated with the at least one of the user or the customer premises 120 that are set on the CPE 105 are associated with user, technician, or customer premises configured settings. Restoring or installing the user configured data or customer premises configured data places the CPE 105 into a state where it can perform as previously configured by a user, technician, CPE 105, and/or user device(s) 110. This is different from a factory default setting which would restore the CPE 105 back into its factory condition without any settings or data configured by a user, technician, CPE 105, and/or user device(s) 110.

Figure 2:
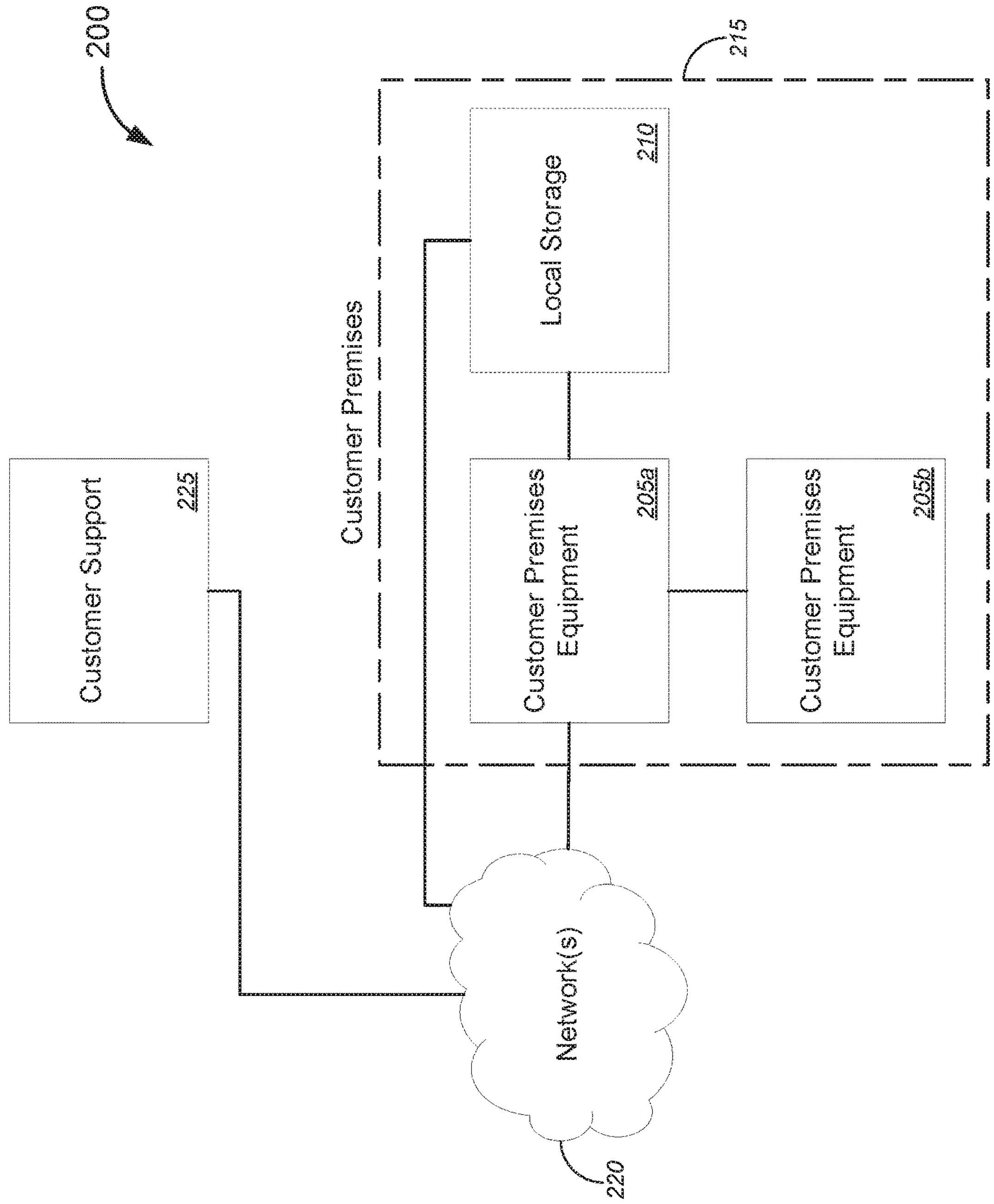
FIG. 2 is a schematic diagram illustrating another system for implementing configuration data and settings on customer premises equipment, in accordance with various embodiments.

FIG. 2 illustrates a system 200 for implementing configuration data and settings on customer premises equipment 205, in accordance with various embodiments.

System 200 might include one or more CPEs 205*a* and 205*b* (collectively, "CPE 205" or "CPEs 205"). CPE 205*a* might additionally include local storage device 210. In some cases, local storage device 210 might be integrated within CPE 205. In other cases, the local storage device 210 might be external to CPE 205. CPE 205 and/or local storage device 210 might additionally be contained within customer premises 215.

In various embodiments, the configuration data and/or settings associated with the at least one of the user or the customer premises 215 of CPE 205 might be stored locally in local storage device 210, using a suitable type of non-volatile storage technology. Examples of such storage technologies might include, but are not limited to, Flash, Electrically Erasable Programmable Random-Access Memory (EEPROM), hard disk, or any other suitable storage technology, and/or the like.

CPE 205 may store configuration settings or data when CPE 205 and/or customer support system 225 detects a change in its configuration settings or data. For example, each time a user or technician changes the configuration settings or data, CPE 205 may store the changed configuration settings or data in local storage device 210. Additionally and/or alternatively, the one or more configuration settings associated with the at least one of the user or the customer premises may be periodically (e.g., hourly, daily, weekly, monthly, etc.) stored on local storage device 210.

The operator's customer support system 225 may have visibility into the CPE 205 as well as local storage device 210 via network(s) 220. In other words, customer support system 225 may be able to access CPE 205 and/or local storage device 210 via network(s) 220. Thus, when a user is attempting to reconfigure CPE 205 or add a new CPE 205, customer support system 225 may assist in reconfiguring CPE 205 or in initiating CPE 205 configuration by accessing local storage device 210 and setting up the stored configuration settings on CPE 205.

In various embodiments, when customer support system 225 and/or CPE 205 detects an error with CPE 205 or detects that a user is attempting to reconfigure CPE 205 or add a new CPE 205, customer support system 225 and/or CPE 205 may prompt the user about restoring a known good data set (i.e., a user configured data set or a data set that has previously been deemed to be optimal or desired, or the like) on CPE 205. Additionally and/or alternatively, when customer support system 225 and/or CPE 205 detects an error with CPE 205 or detects that a new CPE 205 is being added to the customer premises 215, customer support system 225 and/or CPE 205 may automatically restore or set up a known good data set (i.e., a user configured data set or a data set that has previously been deemed to be optimal or desired, or the like) on CPE 205.

In some embodiments, reconfiguration of CPE 205 may need to occur if the configuration data of CPE 205 becomes corrupted or is accidentally misconfigured by a user. When the configuration data of CPE 205 becomes corrupted or is accidentally misconfigured by a user, a known good data set (i.e., a user configured data set or a data set that has previously been deemed to be optimal or desired, or the like) can be retrieved from the local storage device 210 by customer support system 225 and/or CPE 205 and set up on CPE 205.

Additionally and/or alternatively, a user may need to replace CPE 205*a* with CPE 205*b*. CPE 205*a* and/or customer support system 225 may detect a new CPE 205*b* in the customer premises 215. CPE 205*a* and/or customer support system 225 may detect or determine that CPE 205*b* has entered the customer premises by detecting or determining that CPE 205*b* is attempting to connect to a network (e.g., a local area network, and/or the like), or by detecting that CPE 205*b* has been communicatively coupled (via a wired and/or wireless connection) to CPE 205*a*, and/or the like. CPE 205*a* may be communicatively coupled to CPE 205*b* via a wired and/or wireless connection.

CPE 205*a* and/or customer support system 225 may then determine whether the CPE 205*b* is equivalent to CPE 205*a*. CPE 205*b* might be equivalent to CPE 205*a* if CPE 205*b* is the same as CPE 205*a*, if CPE 205*b* is capable of performing similar functionality as CPE 205*a*, and/or the like. Based on a determination that CPE 205*b* is equivalent to CPE 205*a*, CPE 205*a*, CPE 205*b*, and/or customer support system 225 may request to set the one or more configuration settings associated with the at least one of the user or the customer premises 215 on CPE 205*b*. CPE 205*a* may determine whether CPE 205*b* is equivalent to (i.e., the same device, same model device, able to perform the same functionality as) CPE 205*a*. Based on a determination that CPE 205*b* is equivalent to CPE 205*a*, a known good data set (i.e., a user configured data set or a data set that has previously been deemed to be optimal or desired, or the like) can be retrieved from the local storage device 210 and set up on CPE 205*b*. By setting up the configuration settings from CPE 205*a* on CPE 205*b*, no other device that was communicatively coupled to CPE 205*a* need be reprogrammed to communicate with CPE 205*b* because CPE 205*b* has all of the same configuration settings as CPE 205*a*.

Figure 3:
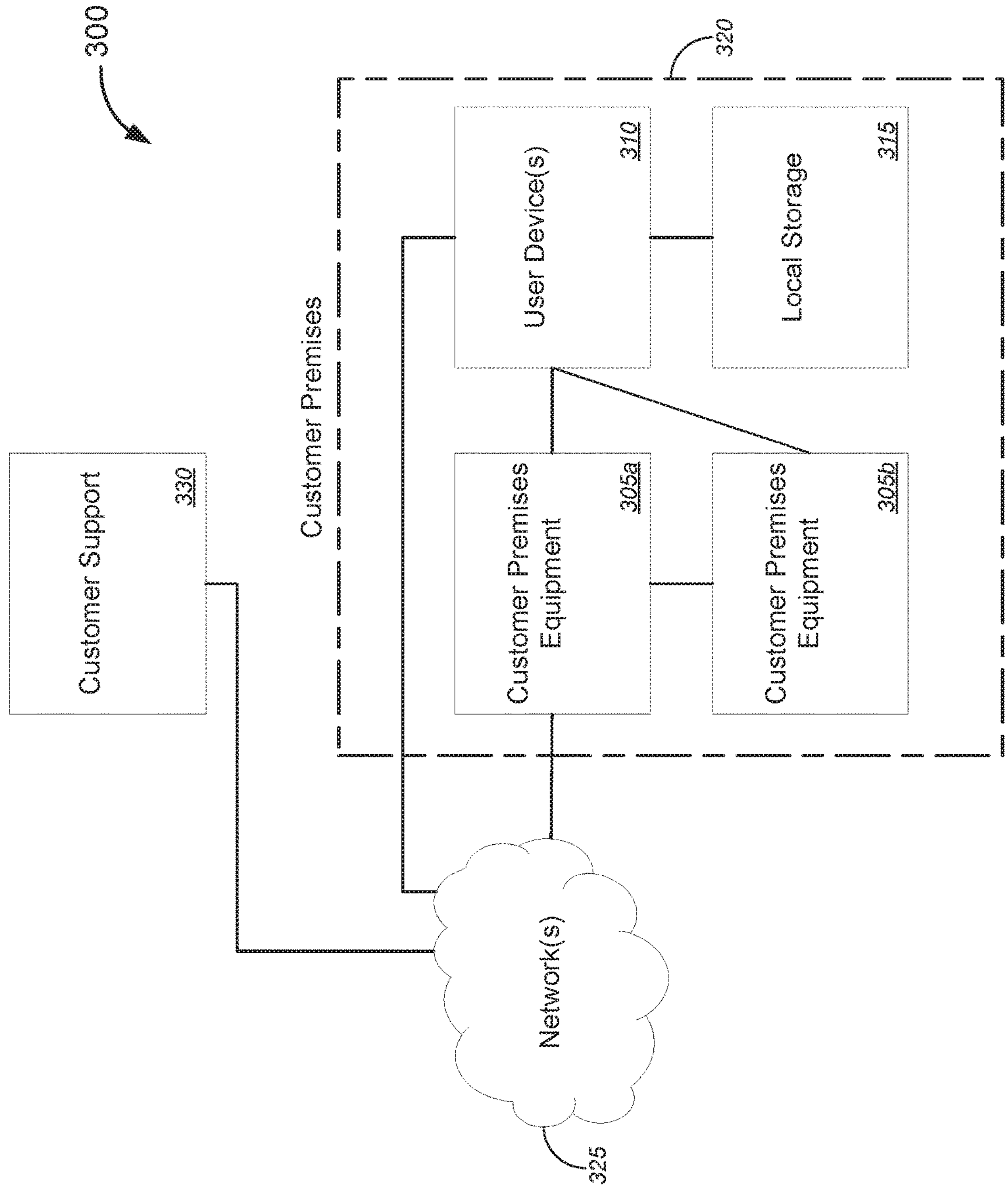
FIG. 3 is a schematic diagram illustrating an additional system for implementing configuration data and settings on customer premises equipment, in accordance with various embodiments.

FIG. 3 illustrates yet another system 300 for implementing configuration data and settings on customer premises equipment 305, in accordance with various embodiments.

System 300 might comprise one or more CPEs 305*a* and 305*b* (collectively, "CPE 305" or "CPEs 305"). System 300 might additionally comprise user device(s) 310 with local storage device(s) 315. In some cases, local storage device(s) 315 might be integrated within user device(s) 310. In other cases, the local storage device(s) 315 might be external to user device(s) 310. CPE 305, user device(s) 310, and/or local storage device(s) 315 might additionally be contained within customer premises 320.

In various embodiments, the configuration data and/or settings associated with the at least one of the user or the customer premises 320 of CPE 305 might be stored locally in local storage device(s) 315 associated with the user device(s) 310, using a suitable type of non-volatile storage technology. Examples of such storage technologies might include, but are not limited to, Flash, Electrically Erasable Programmable Random-Access Memory (EEPROM), hard disk, or any other suitable storage technology, and/or the like.

CPE 305, user device(s) 310, and/or customer support system 330, may store configuration settings or data when CPE 305 and/or user device(s) 310 detects a change in its configuration settings or data on local storage device(s) 315. For example, each time a user or technician or CPE 305 changes the configuration settings or data on CPE 305, CPE 305 and/or user device(s) 310 may store the changed configuration settings or data in local storage device(s) 315. Additionally and/or alternatively, the one or more configuration settings associated with the at least one of the user or the customer premises may be periodically (e.g., hourly, daily, weekly, monthly, etc.) stored on local storage device(s) 315. A user may also request that the configuration settings be stored on a local storage device(s) associated with the CPE 305 or a user device(s) 310. A user may select a particular user device(s) 310 and/or local storage device(s) 315 to store the one or more configuration settings.

The operator's customer support system 330 may have visibility into the CPE 305 as well as user device(s) 310 and local storage device(s) 315 via network(s) 325. A user may opt in to the customer support system 330 having visibility. When the user opts in to the customer support system 330 having visibility, customer support system 330 may be able to access CPE 305, user device(s) 310, and/or local storage device(s) 315 via network(s) 325. Thus, when a user is attempting to reconfigure CPE 305 or to add a new CPE 305, customer support system 330 may assist in reconfiguring CPE 305 or in initiating CPE 305 configuration by accessing local storage device(s) 315 of user device(s) 310 and setting up the stored configuration settings on CPE 305.

In various embodiments, when customer support system 330, CPE 305, and/or user device(s) 310 detects an error with CPE 305 or detects that a user is attempting to reconfigure CPE 305 or to add a new CPE 305, customer support system 330, CPE 305, and/or user device(s) 310 may prompt the user about restoring/setting a known good data set (i.e., a user configured data set or a data set that has previously been deemed to be optimal or desired, or the like) on CPE 305. Additionally and/or alternatively, when customer support system 330, CPE 305, and/or user device(s) 310 detects an error with CPE 305 or detects that a new CPE 305, customer support system 330, CPE 305, and/or user device(s) 310 may automatically restore or set up a known good data set (i.e., a user configured data set or a data set that has previously been deemed to be optimal or desired, or the like) on CPE 305.

In some embodiments, reconfiguration of CPE 305 may need to occur if the configuration data of CPE 305 becomes corrupted or is accidentally misconfigured by a user. When the configuration data of CPE 305 becomes corrupted or is accidentally misconfigured by a user, a known good data set (i.e., a user configured data set or a data set that has previously been deemed to be optimal or desired, or the like) can be retrieved from the local storage device(s) 315 by customer support system 330, CPE 305, and/or user device(s) 310 and set up on CPE 305.

Additionally and/or alternatively, a user may need to replace CPE 305*a* with CPE 305*b*. CPE 305*a*, user device(s) 310, and/or customer support system 330 may detect a new CPE 305*b* in the customer premises 320. CPE 305*a*, user device(s) 310, and/or customer support system 330 may detect or determine that CPE 305*b* has entered the customer premises by detecting or determining that CPE 305*b* is attempting to connect to a network (e.g., a local area network, and/or the like), or by detecting or determining that the CPE 305*b* has been communicatively coupled (via a wired and/or wireless connection) to CPE 305*a*, and/or the like. CPE 305*a* may be communicatively coupled to CPE 305*b* via a wired and/or wireless connection.

CPE 305*a*, user device(s) 310, and/or customer support system 330 may then determine whether the CPE 305*b* is equivalent to CPE 305*a*. CPE 305*b* might be equivalent to CPE 305*a* if CPE 305*b* is the same as CPE 305*a*, if CPE 305*b* is capable of performing similar functionality as CPE 305*a*, and/or the like. Based on a determination that CPE 305*b* is equivalent to CPE 305*a*, CPE 305*a*, CPE 305*b*, user device(s) 310, and/or customer support system 330 may request to set the one or more configuration settings associated with the at least one of the user or the customer premises 325 on CPE 305*b*. CPE 305*a* may determine whether CPE 305*b* is equivalent to (i.e., the same device, same model device, able to perform the same functionality as) CPE 305*a*. Based on a determination that CPE 305*b* is equivalent to CPE 305*a*, a known good data set (i.e., a user configured data set or a data set that has previously been deemed to be optimal or desired, or the like) can be retrieved from the local storage device(s) 315 and set up on CPE 305*b*. By setting up the configuration settings from CPE 305*a* on CPE 305*b*, no other device that was communicatively coupled to CPE 305*a* needs to be reprogrammed to communicate with CPE 305*b* because CPE 305*b* has all of the same configuration settings as CPE 305*a*.

Figure 4:
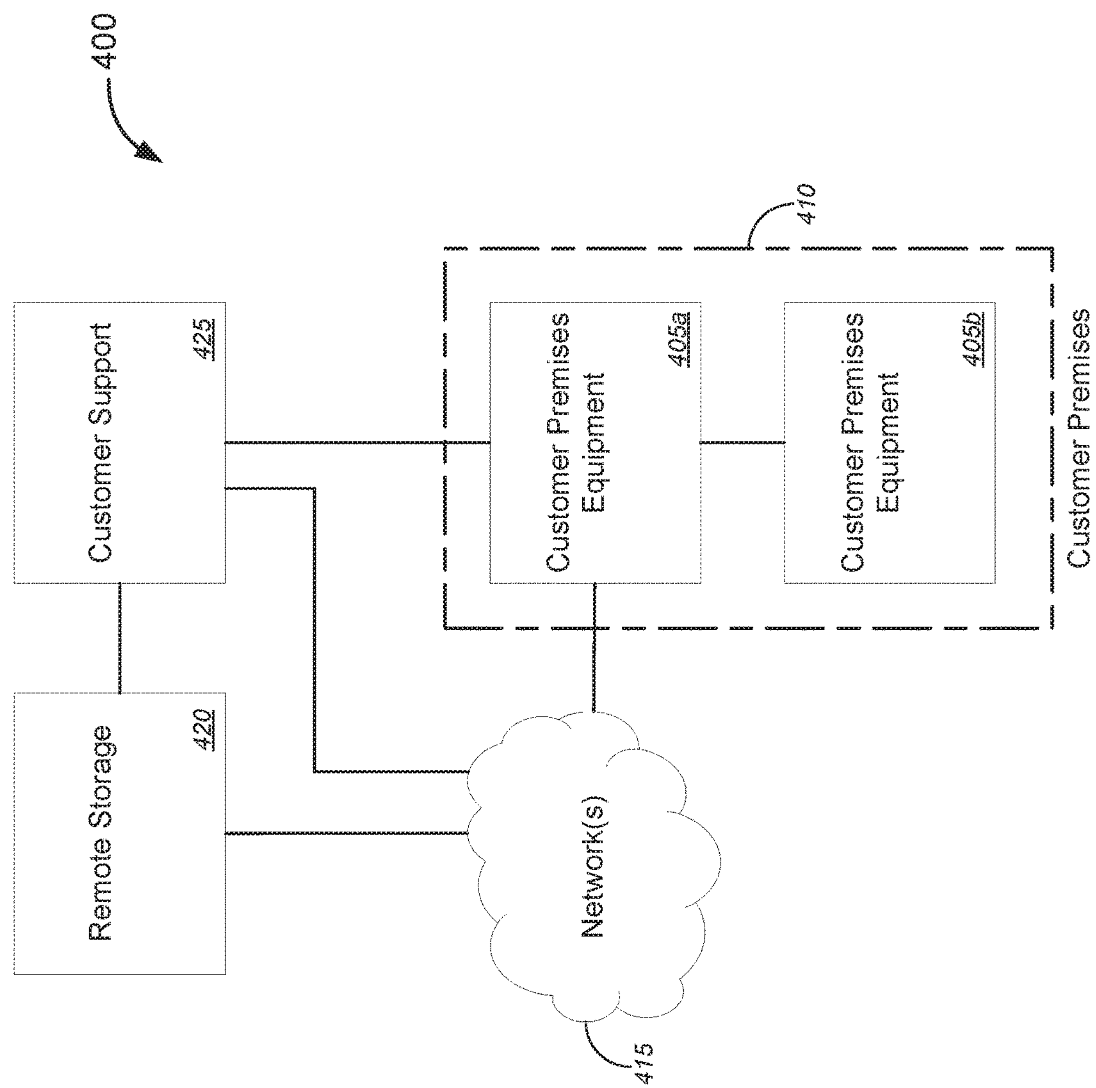
FIG. 4 is a schematic diagram illustrating yet another system for implementing configuration data and settings on customer premises equipment, in accordance with various embodiments

FIG. 4 illustrates a system 400 for implementing configuration data and settings on customer premises equipment 405, in accordance with various embodiments.

System 400 might comprise one or more CPEs 405*a* and 405*b* (collectively, "CPE 405" or "CPEs 405"). CPE 405 might be contained within customer premises 410.

In various embodiments, the configuration data and/or settings associated with the at least one of the user or the customer premises 410 of CPE 405 might be stored remotely in remote storage device 420, using a suitable type of non-volatile storage technology. Examples of such storage technologies might include, but are not limited to, Flash, Electrically Erasable Programmable Random-Access Memory (EEPROM), hard disk, or any other suitable storage technology, and/or the like. Remote storage device 420 may be located in a service provider network, a content provider network, or a customer support system 425, and/or the like. CPE 405 might be communicatively coupled to remote storage device 420 via one or more network(s) 415.

CPE 405 may store configuration settings or data when CPE 405 and/or customer support system 425 detects a change in its configuration settings or data. For example, each time a user or technician changes the configuration settings or data, CPE 405 may store the changed configuration settings or data in remote storage device 420. Additionally and/or alternatively, the one or more configuration settings associated with the at least one of the user or the customer premises may be periodically (e.g., hourly, daily, weekly, monthly, etc.) stored on remote storage device 420.

The operator's customer support system 425 may have visibility into the CPE 405 as well as remote storage device 420 via network(s) 415. Additionally and/or alternatively, remote storage device 420 may be located in customer support system 425. Thus, when a user is attempting to reconfigure CPE 405 or to add a new CPE 405, customer support system 425 may assist in reconfiguring CPE 405 or in initiating CPE 405 configuration by accessing remote storage device 420 and setting up the stored configuration settings on CPE 405.

In various embodiments, when customer support system 425 and/or CPE 405, detects an error with CPE 405 or detects that a user is attempting to reconfigure CPE 405 or to add a new CPE 405, customer support system 425 and/or CPE 405 may prompt the user about restoring a known good data set (i.e., a user configured data set or a data set that has previously been deemed to be optimal or desired, or the like) on CPE 405. Additionally and/or alternatively, when customer support system 425 and/or CPE 405 detects an error with CPE 405 or detects that a new CPE 405, customer support system 425 and/or CPE 405 may automatically restore or set up a known good data set (i.e., a user configured data set or a data set that has previously been deemed to be optimal or desired, or the like) on CPE 405.

In some embodiments, reconfiguration of CPE 405 may need to occur if the configuration data of CPE 405 becomes corrupted or is accidentally misconfigured by a user. When the configuration data of CPE 405 becomes corrupted or is accidentally misconfigured by a user, a known good data set (i.e., a user configured data set or a data set that has previously been deemed to be optimal or desired, or the like) can be retrieved from the remote storage device 420 by customer support system 425 and/or CPE 405 and set up on CPE 405.

Additionally and/or alternatively, a user may need to replace CPE 405*a* with CPE 405*b*. CPE 405*a* and/or customer support system 425 may detect a new CPE 405*b* in the customer premises 410. CPE 405*a* and/or customer support system 425 may detect or determine that CPE 405*b* has entered the customer premises by detecting or determining that CPE 405*b* is attempting to connect to a network (e.g., a local area network, and/or the like), or by detecting or determining that the CPE 405*b* has been communicatively coupled (via a wired and/or wireless connection) to CPE 405*a*, and/or the like. CPE 405*a* may be communicatively coupled to CPE 405*b* via a wired and/or wireless connection.

CPE 405*a* and/or customer support system 425 may then determine whether the CPE 405*b* is equivalent to CPE 405*a*. CPE 405*b* might be equivalent to CPE 405*a* if CPE 405*b* is the same as CPE 405*a*, if CPE 405*b* is capable of performing similar functionality as CPE 405*a*, and/or the like. Based on a determination that CPE 405*b* is equivalent to CPE 405*a*, CPE 405*a*, CPE 405*b*, and/or customer support system 425 may request to set the one or more configuration settings associated with the at least one of the user or the customer premises 410 on CPE 405*b*. CPE 405*a* may determine whether CPE 405*b* is equivalent to (i.e., the same device, same model device, able to perform the same functionality as) CPE 405*a*. Based on a determination that CPE 405*b* is equivalent to CPE 405*a*, a known good data set (i.e., a user configured data set or a data set that has previously been deemed to be optimal or desired, or the like) can be retrieved from the remote storage device 420 and set up on CPE 405*b*. By setting up the configuration settings from CPE 405*a* on CPE 405*b*, no other device that was communicatively coupled to CPE 405*a* needs to be reprogrammed to communicate with CPE 405*b* because CPE 405*b* has all of the same configuration settings as CPE 405*a*.

Figure 5:
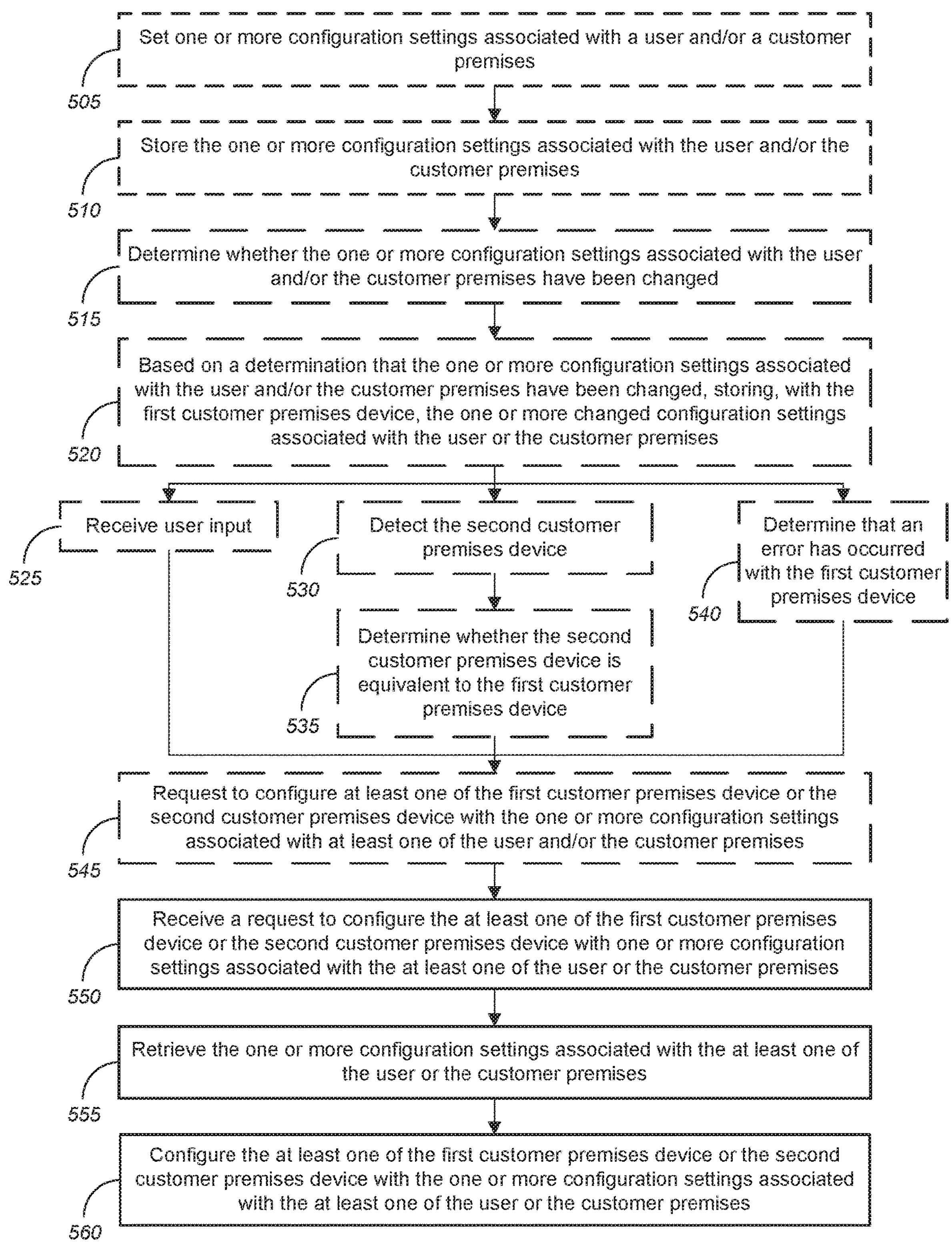
FIG. 5 is a flow diagram illustrating a method for implementing configuration data and settings on customer premises equipment, in accordance with various embodiments.

FIG. 5 is a flow diagram illustrating a method 500 for implementing configuration data and settings on customer premises equipment, in accordance with various embodiments.

While the techniques and procedures are depicted and/or described in a certain order for purposes of illustration, it should be appreciated that certain procedures may be reordered and/or omitted within the scope of various embodiments. Moreover, while the method 500 illustrated by FIG. 5 can be implemented by or with (and, in some cases, are described below with respect to) the systems 100, 200, 300, and 400 of FIGS. 1, 2, 3, and 4, respectively (or components thereof), such methods may also be implemented using any suitable hardware (or software) implementation. Similarly, while each of the systems 100, 200, 300, and 400 of FIGS. 1, 2, 3, and 4, respectively (or components thereof), can operate according to the method 500 illustrated by FIG. 5 (e.g., by executing instructions embodied on a computer readable medium), the systems 100, 200, 300, and 400 of FIGS. 1, 2, 3, and 4, respectively, can each also operate according to other modes of operation and/or perform other suitable procedures.

In the non-limiting embodiment of FIG. 5, method 500, at optional block 505, might comprise setting one or more configuration settings associated with at least one of a user or a customer premises on a first customer premises device. The first customer premises device might include, but is not limited to, one of a modem, an optical network terminal, a set-top box ("STB"), a gateway, a media player, a gaming console, a camera, a sensor, a thermostat, a desktop computer, or a laptop computer, and/or the like. The modem might include at least one of a digital subscriber line modem, a G.fast modem, or a cable modem, and/or the like. The set-top box might include an internet protocol television set-top box, or an over-the-top set-top box, and/or the like. The gateway might include at least one of a residential gateway, business gateway, a pay-per-view gateway, or a security gateway, and/or the like.

The one or more configuration settings might be set manually by a user, manually by a technician installing or servicing the first customer premises device, automatically by the first customer premises device, or automatically by a user device (e.g., one of a laptop computer, a tablet computer, a desktop computer, a smart phone, a mobile phone, a personal digital assistant, a remote control device, a gaming console, a set-top box, a media player, a portable gaming device, a camera, a sensor, or a thermostat, and/or the like), and/or the like.

The one or more configuration settings may be different from factory settings of a customer premises device and unique to the at least one of the user or the customer premises. The one or more configuration settings or data might include, but are not limited to, one or more local area network settings, one or more wide area network settings, one or more service set identifiers, one or more login credentials (e.g., login name, password, email address, etc.), one or more Internet protocol ("IP") addresses, one or more domain names, one or more security settings, one or more remote management settings, one or more encryption types, one or more frequency settings (e.g., bandwidth settings, frequency agility settings, one or more blocked addresses (e.g., website addresses, media access control addresses, etc.), one or more permitted addresses (e.g., website addresses, media access control addresses, etc.), one or more calibration settings (e.g., calibration settings of television, calibration settings of modem, etc.), one or more display settings (e.g., display settings of television, etc.), or one or more temperature settings, and/or the like.

Method 500 might further comprise, at optional block 510, storing the one or more configuration settings associated with the at least one of the user or the customer premises. The first customer premises device may store the configuration settings locally or remotely in a local storage communicatively coupled to the first customer premises device or in a remote storage communicatively coupled to the first customer premises device. The remote storage might be located in a service provider or content provider network. Additionally and/or alternatively, the remote storage may be located in a user device located at the customer premises.

At optional block 515, method 500 might comprise determining, with the first customer premises device, whether the one or more configuration settings associated with the at least one of the user or the customer premises have been changed. A user and/or technician may manually change the one or more configuration settings. Alternatively, the first customer premises device may change the configuration settings automatically. At optional block 520, method 500 might additionally comprise storing, with the first customer premises device, the one or more changed configuration settings associated with the at least one of the user or the customer premises, based on a determination that the one or more configuration settings associated with the at least one of the user or the customer premises have been changed.

Additionally and/or alternatively, the one or more configuration settings associated with the at least one of the user or the customer premises may be periodically (e.g., hourly, daily, weekly, monthly, etc.) stored on a local storage device and/or remote storage device.

Method 500 might additionally receive user input at optional block 525. The user input might be received at a first customer premises device, a second customer premises device, or through a user device, and/or the like. Additionally and/or alternatively, a first customer premises device or a user device may detect a second customer premises device, at optional block 530. At optional block 535, the first customer premises device or the user device may then determine whether the second customer premises device is equivalent to (i.e., the same device or same model device as) the first customer premises device. In additional embodiments, a first customer premises device or a user device, at optional block 540, may determine that an error has occurred with the first customer premises device.

The second customer premises device might include, but is not limited to, one of a modem, an optical network terminal, a set-top box ("STB"), a gateway, a media player, a gaming console, a camera, a sensor, a thermostat, a desktop computer, or a laptop computer, and/or the like. The modem might include at least one of a digital subscriber line modem, a G.fast modem, or a cable modem, and/or the like. The set-top box might include an internet protocol television set-top box, or an over-the-top set-top box, and/or the like. The gateway might include at least one of a residential gateway, business gateway, a pay-per-view gateway, or a security gateway, and/or the like.

Based on at least one of the user input, the determination that the second customer premises device is equivalent to the first customer premises device, and/or the determination that an error has occurred with the first customer premises device, method 500, at optional block 545, may request, using the first customer premises device, the second customer premises device, and/or the user device, to configure at least one of the first customer premises device or the second customer premises device with the one or more configuration settings associated with at least one of the user or the customer premises.

The method 500, at block 550, might then receive a request to configure the at least one of the first customer premises device or the second customer premises device with one or more configuration settings associated with the at least one of the user or the customer premises. The request may be received from a user, a first customer premises device, a second customer premises device, or a user device.

When a request is received from a user, a second equivalent customer premises device is detected, and/or an error has occurred with the first customer premises device, the method 500, at block 555, may continue with retrieving the one or more configuration settings associated with the at least one of the user or the customer premises. The one or more configuration settings may be retrieved from at least one of a local storage device or a remote storage device by the first customer premises device, the second customer premises device, or the user device, and/or the like. Additionally and/or alternatively, the one or more configuration settings may have been previously saved by at least one of a user, the first customer premises device, or the user device, and/or the like. These stored configuration settings associated with the user and/or customer premises are different from factory settings designed to place a customer premises device back into its factory state.

The one or more configuration settings may be automatically retrieved by the first customer premises device, the second customer premises device, or the user device, and/or the like, based on the detection of an equivalent second customer premises device or a determination that an error has occurred with the first customer premises device. Additionally and/or alternatively, the first customer premises device, the second customer premises device, or the user device, and/or the like may prompt a user to set the one or more configuration settings on the first customer premises device and/or the second customer premises device based on the detection of an equivalent second customer premises device or a determination that an error has occurred with the first customer premises device.

The first customer premises device, the second customer premises device, or the user device, and/or the like may detect or identify a user device that is in close proximity or near the at least one of the first customer premises device or the second customer premises device. The prompt may then be displayed on a user device that is in close proximity or near at least one of the first customer premises device or the second customer premises device. Additionally and/or alternatively, the first customer premises device and/or the second customer premises device may display the prompt.

The method 500, at block 560, might additionally include configuring, with the at least one of the first customer premises device, the user device, or the second customer premises device, the at least one of the first customer premises device or the second customer premises device with the one or more configuration settings associated with the at least one of the user or the customer premises. Each of the first customer premises device, the second customer premises device, and/or the user device, and/or the like, may set the one or more configuration settings on the first customer premises device and/or the second customer premises device.

Exemplary System and Hardware Implementation

Figure 6:
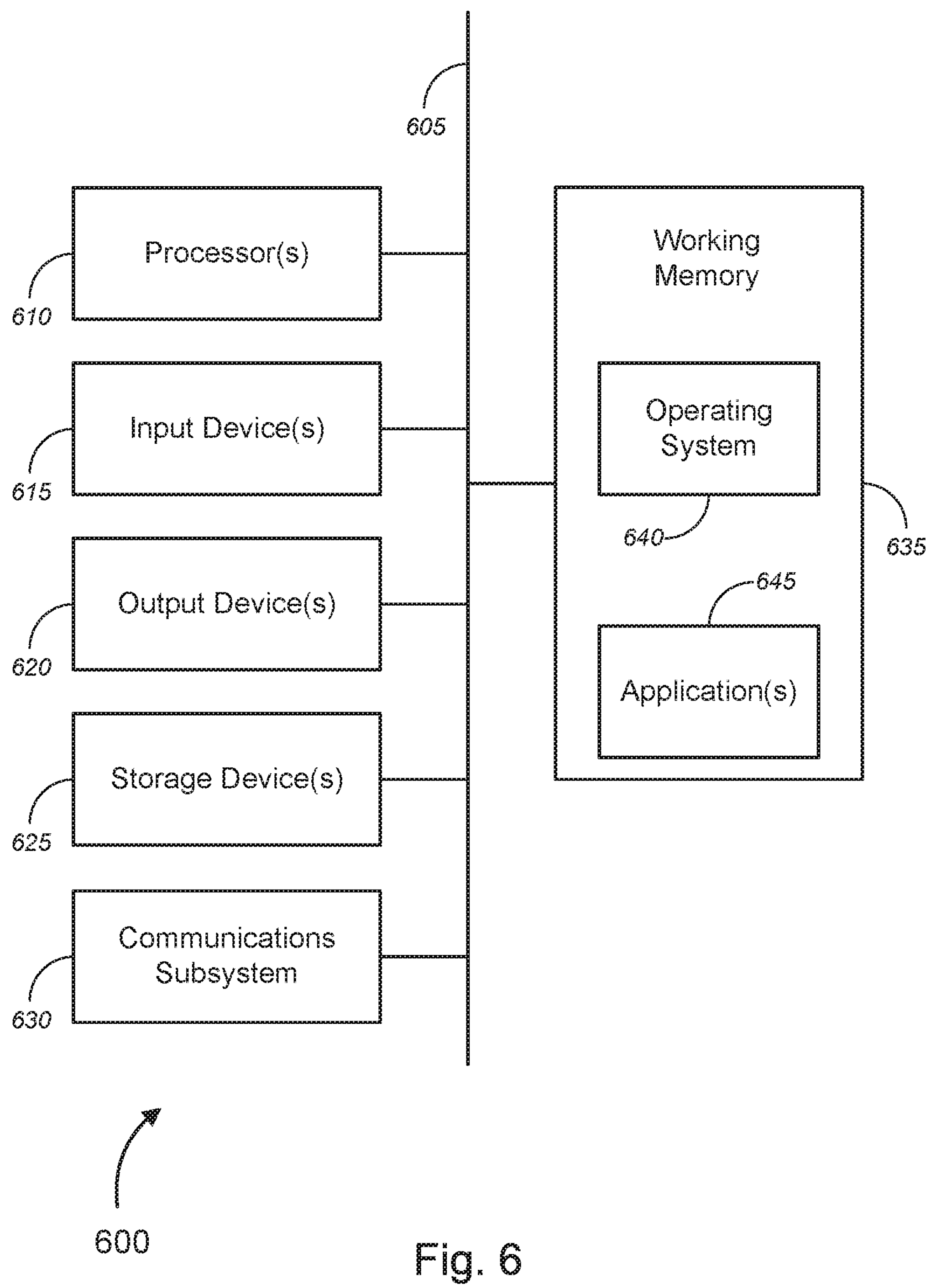
FIG. 6 is a block diagram illustrating an exemplary computer or system hardware architecture, in accordance with various embodiments.

FIG. 6 is a block diagram illustrating an exemplary computer or system hardware architecture, in accordance with various embodiments. FIG. 6 provides a schematic illustration of one embodiment of a computer system 600 of the service provider system hardware that can perform the methods provided by various other embodiments, as described herein, and/or can perform the functions of computer or hardware system (i.e., customer premises equipment 105, 205, 305, and 405, user devices 110 and 310, customer support systems 135, 225, 330, and 425, local storage devices 115, 210, and 315, and remote storage devices 130 and 420, etc.), as described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer or hardware system 600—which might represent an embodiment of the computer or hardware system (i.e., customer premises equipment 105, 205, 305, and 405, user devices 110 and 310, customer support systems 135, 225, 330, and 425, local storage devices 115, 210, and 315, and remote storage devices 130 and 420, etc.), described above with respect to FIGS. 1-5—is shown comprising hardware elements that can be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and/or the like); one or more input devices 615, which can include, without limitation, a mouse, a keyboard and/or the like; and one or more output devices 620, which can include, without limitation, a display device, a printer, and/or the like.

The computer or hardware system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 600 might also include a communications subsystem 630, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. In some aspects, the communications subsystem 630 might also comprise a wireless video link system, which might utilize a wireless video link protocol comprising at least one of WirelessHD protocol, Wireless Home Digital Interface ("WHDI") protocol, or Wireless Gigabit Alliance ("WiGig") protocol, and/or the like. The communications subsystem 630 may permit data to be exchanged with a network (such as the network described below, to name one example), with other computer or hardware systems, and/or with any other devices described herein. In many embodiments, the computer or hardware system 600 will further comprise a working memory 635, which can include a RAM or ROM device, as described above.

The computer or hardware system 600 also may comprise software elements, shown as being currently located within the working memory 635, including an operating system 640, device drivers, executable libraries, and/or other code, such as one or more application programs 645, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 600 and/or might take the form of source and/or installable code, which, upon compilation and/or installation on the computer or hardware system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 600) to perform methods in accordance with various embodiments of the invention. According to a set of embodiments, some or all of the procedures of such methods are performed by the computer or hardware system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally will receive the signals, and the bus 605 then might carry the signals (and/or the data, instructions, etc. carried by the signals) to the working memory 635, from which the processor(s) 605 retrieves and executes the instructions. The instructions received by the working memory 635 may optionally be stored on a storage device 625 either before or after execution by the processor(s) 610.

Figure 7:
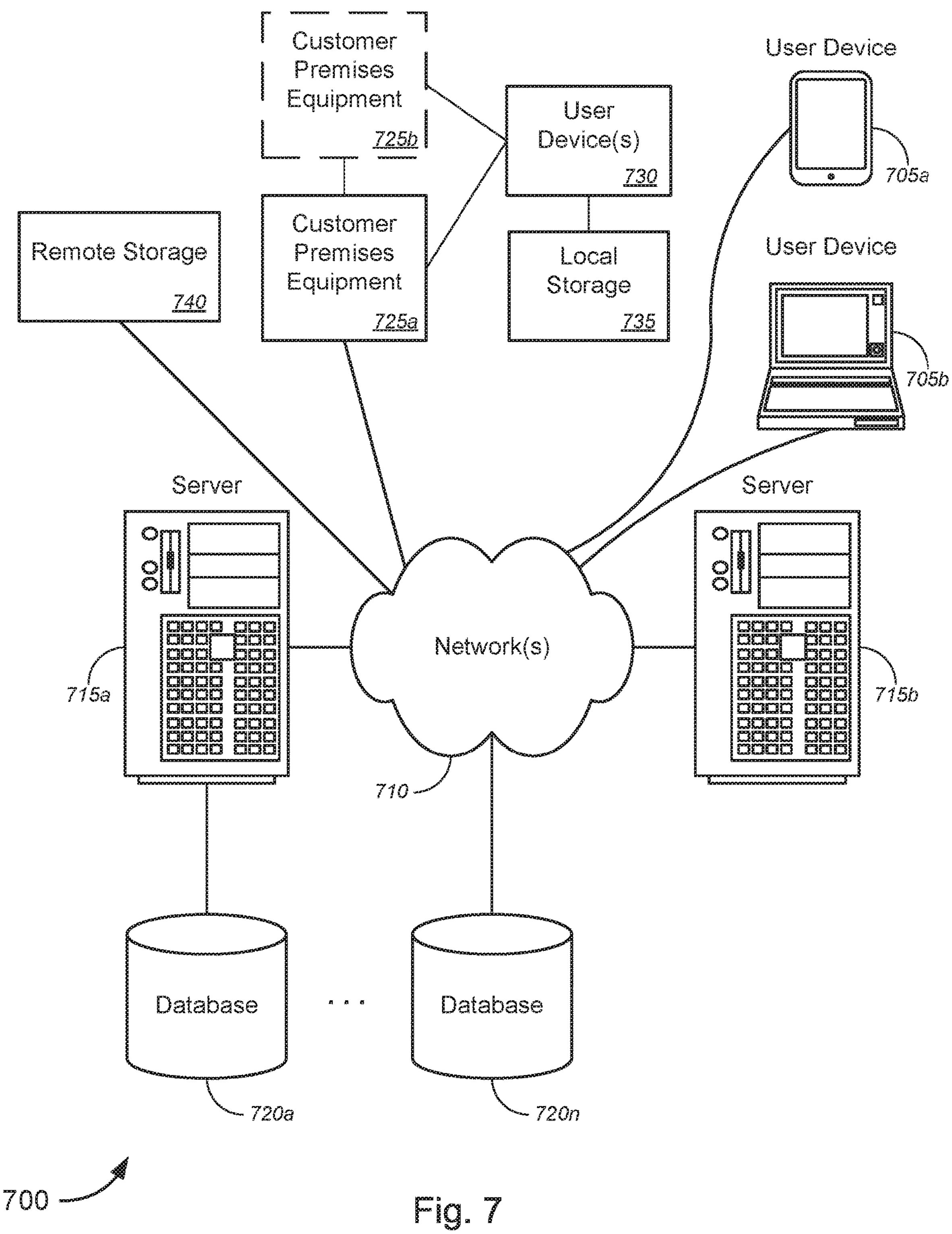
FIG. 7 is a block diagram illustrating a networked system of computers, computing systems, or system hardware architecture, which can be used in accordance with various embodiments.

As noted above, a set of embodiments comprises methods and systems for implementing configuration data and settings on customer premises equipment ("CPE"), and, more particularly, to methods, systems, and apparatuses for implementing storage, retrieval, and transfer of configuration data and settings on CPE. FIG. 7 illustrates a schematic diagram of a system 700 that can be used in accordance with one set of embodiments. The system 700 can include one or more user computers, user devices, or customer devices 705. A user computer, user device, or customer device 705 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 705 can also have any of a variety of applications, including one or more applications configured to perform methods provided by various embodiments (as described above, for example), as well as one or more office applications, database client and/or server applications, and/or web browser applications. Alternatively, a user computer, user device, or customer device 705 can be any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user computers, user devices, or customer devices 705, any number of user computers, user devices, or customer devices can be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 710 (similar to network(s) 125 of FIG. 1, network(s) 220 of FIG. 2, network(s) 325 of FIG. 3, and network(s) 415 of FIG. 4, or the like) can each include a local area network ("LAN"), including, without limitation, a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications accessible by a client running on one or more of the client computers 705 and/or other servers 715. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing configuration data and settings on customer premises equipment ("CPE"), and, more particularly, to methods, systems, and apparatuses for implementing storage, retrieval, and transfer of configuration data and settings on CPE, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases **720*a*-720*n* (collectively, "databases 720"). The location of each of the databases 720 is discretionary: merely by way of example, a database 720*a* might reside on a storage medium local to (and/or resident in) a server 715*a* (and/or a user computer, user device, or customer device 705). Alternatively, a database 720*n* can be remote from any or all of the computers 705, 715, so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715 can be stored locally on the respective computer and/or remotely, as appropriate.) In one set of embodiments, the database 720** can be a relational database, such as an Oracle database, that is adapted to store, update, and retrieve data in response to SQL-formatted commands. The database might be controlled and/or maintained by a database server, as described above, for example.

According to some embodiments, system 700 might further comprise customer premises equipment ("CPE") 725*a* and 725*b* (similar to customer premises equipment 105, 205, 305, and 405 of FIGS. 1-4, etc.), one or more storage devices (e.g., local storage device 735, remote storage device 740, and/or the like; similar to local storage devices 115, 210, and 315, and/or remote storage device 130 and 420 of FIGS. 1-4), and/or the like.

In operation, the CPE 725 or user device(s) 730 might set one or more configuration settings associated with at least one of a user or a customer premises on CPE 725. The one or more configuration settings may then be stored in local storage device 735 and/or remote storage device 740. Next, the CPE 725 or user device(s) 730 might receive a request to set the one or more configuration settings associated with at least one of the user or the customer premises on CPE 725. Based on the request received, the CPE 725 and/or user device(s) 730 may retrieve the one or more configuration settings associated with the at least one of the user or the customer premises from local storage device 735, or remote storage device 740, and/or the like. The CPE 725 and/or user device(s) 730 may then set the one or more configuration settings associated with the at least one of the user or the customer premises on the CPE 725 (e.g., CPE 725*a* and/or CPE 725*b*, and/or the like).

Restoring or installing the user configured data or settings puts CPE 725 into a state where it can perform as previously configured by a user or technician. This is different from a factory default setting which would restore the CPE 725 back into its factory condition without any settings or data configured by a user. Thus, configuration settings configured by a user or technician may easily be restored or an old CPE 725*a* may be easily swapped out to be replaced by a new CPE 725*a*, without having to manually reprogram any user devices 730 and/or other CPE 725.

These and other functions of the system 700 (and its components) are described in greater detail above with respect to FIGS. 1-6.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:

determining, with a first customer premises device, that a second customer premises device has entered a customer premises;

based on a determination that the second customer premises device has entered the customer premises, determining, with the first customer premises device, whether the second customer premises device is a replacement for the first customer premises device by determining whether the second customer premises device is equivalent to the first customer premises device, wherein the second customer premises device is equivalent to the first customer premises device when the second customer premises device is capable of performing similar functionality as the first customer premises device;

based on a determination that the second customer premises device is the replacement for the first customer premises device and is equivalent to the first customer premises device, retrieving, with at least one of the first customer premises device or the second customer premises device, one or more configuration settings of the first customer premises device, transferring, with the at least one of the first customer premises device or the second customer premises device, the one or more configuration settings of the first customer premises device to the second customer premises device, and configuring, with the at least one of the first customer premises device or the second customer premises device, the second customer premises device with the one or more configuration settings of the first customer premises device, wherein the one or more configuration settings are associated with the at least one of the user or the customer premises, and wherein at least one first configuration setting of the one or more configuration settings configured on the second customer premises device is the same as at least one second configuration setting of the one or more configuration settings on the first customer premises device; and replacing the first customer premises device with the second customer premises device, wherein one or more first user devices that were communicatively coupled to the first customer premises device do not need to be reprogrammed to communicate with the second customer premises device.

2. The method of claim 1, wherein at least one of the first customer premises device or the second customer premises device comprises at least one of a modem, an optical network terminal, a set-top box, a gateway device, a media player, a gaming console, a camera, a sensor, a thermostat, a desktop computer, or a laptop computer.

3. The method of claim 1, further comprising:

setting, on the first customer premises device, the one or more configuration settings associated with the at least one of the user or the customer premises;

storing, with the first customer premises device, the one or more configuration settings associated with the at least one of the user or the customer premises.

4. The method of claim 1, wherein the one or more configuration settings comprise at least one of one or more local area network settings, one or more wide area network settings, one or more service set identifiers, one or more login credentials, one or more Internet protocol ("IP") addresses, one or more domain names, one or more security settings, one or more remote management settings, one or more encryption types, one or more frequency settings, one or more blocked addresses, one or more permitted addresses, one or more calibration settings, one or more display settings, or one or more temperature settings.

5. The method of claim 1, wherein the one or more configuration settings associated with the at least one of the user or the customer premises are stored on and retrieved from at least one of a local storage device associated with the first customer premises device, a remote storage device associated with a second user device located at the customer premises, or a remote storage device located in a service provider network.

6. The method of claim 1, further comprising:

determining, with the first customer premises device, whether the one or more configuration settings associated with the at least one of the user or the customer premises have been changed; and based on a determination that the one or more configuration settings associated with the at least one of the user or the customer premises have been changed, storing, with the first customer premises device, the one or more changed configuration settings associated with the at least one of the user or the customer premises.

7. The method of claim 1, wherein the one or more configuration settings associated with the at least one of the user or the customer premises are periodically stored on a local storage device or remote storage device.

8. The method of claim 1, wherein retrieving, with the one of the first customer premises device or the second customer premises device, the one or more configuration settings associated with the at least one of the user or the customer premises, and configuring, with the one of the first customer premises device or the second customer premises device, the second customer premises device with the one or more configuration settings associated with the at least one of the user or the customer premises is performed automatically in response to the determination that the second customer premises device is equivalent to the first customer premises device.

9. The method of claim 1, further comprising:

based on a determination that the second customer premises device is equivalent to the first customer premises device, prompting the user to set the one or more configuration settings associated with the at least one of the user or the customer premises on the second customer premises device;

receiving, with the one of the first customer premises device or the second customer premises device, an indication to set the one or more configuration settings associated with the at least one of the user or the customer premises on the second customer premises device; and configuring, with the one of the first customer premises device or the second customer premises device, the second customer premises device with the one or more configuration settings associated with the at least one of the user or the customer premises.

10. The method of claim 9, wherein the prompt is displayed on a second user device near at least one of the first customer premises device or the second customer premises device.

11. The method of claim 1, wherein the first customer premises device and the second customer premises device are communicatively coupled via at least one of a wired connection or a wireless connection.

12. The method of claim 1, further comprising:

determining, with the first customer premises device, that an error has occurred with the first customer premises device;

based on a determination that an error has occurred with the first customer premises device, retrieving, with the first customer premises device, the one or more configuration settings associated with the at least one of the user or the customer premises; and configuring, with the first customer premises device, the first customer premises device with the one or more configuration settings associated with the at least one of the user or the customer premises.

13. An apparatus, comprising:

at least one processor; and a non-transitory computer readable medium communicatively coupled to the at least one processor, the non-transitory computer readable medium having stored thereon computer software comprising a set of instructions that, when executed by the at least one processor, causes the apparatus to:

determine that a first customer premises device has entered a customer premises;

based on a determination that the first customer premises device has entered the customer premises, determine whether the first customer premises device is a replacement for the first customer premises device by determining whether the second customer premises device is equivalent to a second customer premises device, wherein the second customer premises device is equivalent to the first customer premises device when the second customer premises device is capable of performing similar functionality as the first customer premises device;

based on a determination that the first customer premises device is the replacement for the first customer premises device and is equivalent to the second customer premises device, retrieve one or more configuration settings of the first customer premises device, transfer the one or more configuration settings of the first customer premises device to the second customer premises device, and configure the first customer premises device with the one or more configuration settings of the first customer premises device, wherein the one or more configuration settings are associated with the at least one of the user or the customer premises, and wherein at least one first configuration setting of the one or more configuration settings configured on the second customer premises device is the same as at least one second configuration setting of the one or more configuration settings on the first customer premises device; and replace the second customer premises device with the first customer premises device, wherein one or more first user devices that were communicatively coupled to the second customer premises device do not need to be reprogrammed to communicate with the first customer premises device.

14. The apparatus of claim 13, wherein the apparatus and the second customer premises device are the same device.

15. The apparatus of claim 13, wherein the apparatus and the second customer premises device are different devices.

16. The apparatus of claim 13, wherein the one or more configuration settings comprise at least one of one or more local area network settings, one or more wide area network settings, one or more service set identifiers, one or more login credentials, one or more Internet protocol ("IP") addresses, one or more domain names, one or more security settings, one or more remote management settings, one or more encryption types, one or more frequency settings, one or more blocked addresses, one or more permitted addresses, one or more calibration settings, one or more display settings, or one or more temperature settings.

17. The apparatus of claim 13, wherein the one or more configuration settings associated with the at least one of the user or the customer premises are stored on and retrieved from at least one of a local storage device associated with the second customer premises device, a remote storage device associated with a device located at the customer premises, or a remote storage device located in a service provider network.

18. A system comprising:

a first customer premises device, comprising:

at least one first processor; and a first non-transitory computer readable medium communicatively coupled to the at least one first processor, the first non-transitory computer readable medium having stored thereon computer software comprising a first set of instructions that, when executed by the at least one first processor, causes the first customer premises device to:

determine that a second customer premises device has entered a customer premises;

based on a determination that the second customer premises device has entered the customer premises, determine whether the second customer premises device is a replacement for the first customer premises device by determining whether the second customer premises device is equivalent to the first customer premises device, wherein the second customer premises device is equivalent to the first customer premises device when the second customer premises device is capable of performing similar functionality as the first customer premises device; and based on a determination that the second customer premises device is the replacement for the first customer premises device and is equivalent to the first customer premises device, retrieve one or more configuration settings of the first customer premises device, transfer the one or more configuration settings of the first customer premises device to the second customer premises device, and configure the second customer premises device with the one or more configuration settings of the first customer premises device, wherein the one or more configuration settings are associated with at least one of the user or the customer premises, wherein at least one first configuration setting of the one or more configuration settings configured on the second customer premises device is the same as at least one second configuration setting of the one or more configuration settings on the first customer premises device, wherein the second customer premises device replaces the first customer premises device, and wherein one or more first user devices that were communicatively coupled to the first customer premises device do not need to be reprogrammed to communicate with the second customer premises device.

19. The system of claim 18 further comprising:

the second customer premises device, comprising:

at least one second processor; and a second non-transitory computer readable medium communicatively coupled to the at least one second processor, the second non-transitory computer readable medium having stored thereon computer software comprising a second set of instructions that, when executed by the at least one second processor, causes the second customer premises device to:

retrieve the one or more configuration settings associated with the at least one of the user or the customer premises;

configure the second customer premises device with the one or more configuration settings associated with the at least one of the user or the customer premises; and replace the first customer premises device, wherein the one or more first user devices that were communicatively coupled to the first customer premises device do not need to be reprogrammed to communicate with the second customer premises device.

20. The system of claim 18, wherein the one or more configuration settings comprise at least one of one or more local area network settings, one or more wide area network settings, one or more service set identifiers, one or more login credentials, one or more Internet protocol ("IP") addresses, one or more domain names, one or more security settings, one or more remote management settings, one or more encryption types, one or more frequency settings, one or more blocked addresses, one or more permitted addresses, one or more calibration settings, one or more display settings, or one or more temperature settings.

* * * * *